Sept. 16, 1952 K. E. APPERT 2,611,031

CARRIER TYPE SIGNALING SYSTEM

Filed Feb. 18, 1949

INVENTOR,
KURT E. APPERT
BY
Lippincott & Smith
ATTORNEYS

Patented Sept. 16, 1952

2,611,031

UNITED STATES PATENT OFFICE 2,611,031

CARRIER TYPE SIGNALING SYSTEM

Kurt E. Appert, San Francisco, Calif., assignor to Lenkurt Electric Co., Inc., San Carlos, Calif., a corporation of Delaware Application February 18, 1949, Serial No. 77,240

11 Claims. (Cl. 178—66)

Figure 2:
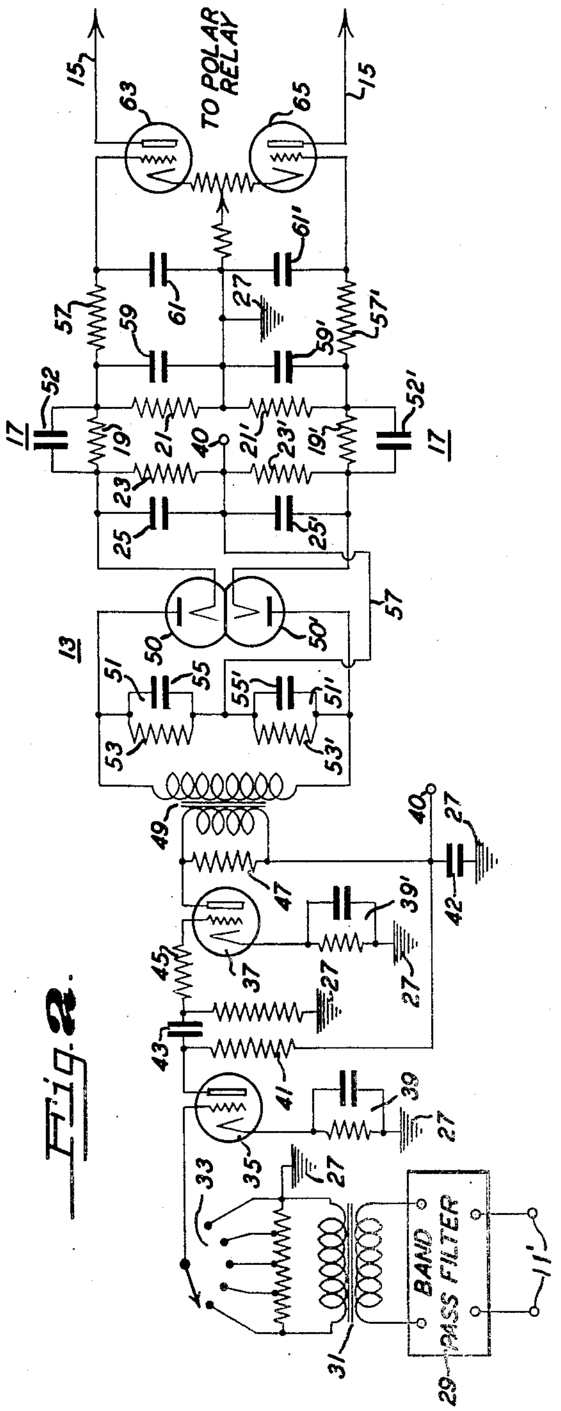

This invention relates to signalling circuits and particularly to signalling circuits of the carrier type wherein a multiplicity of signals are transmitted over one main carrier.

The invention is particularly concerned with a signal receiving and reproducing unit in which the deleterious effects of D. C. drift brought about by shifts in the carrier frequency of the transmitting station shall be minimized.

In carrier types of transmission where a multiplicity of messages are sent out on one carrier and where the cyclic frequency shift method is utilized to distinguish between so-called marking intervals and spacing intervals it is usually customary to provide one main carrier for transmission and then to modulate this carrier by the separately selected signals which, where desired, usually appear as separate sub-carriers. Heretofore, because of the fact that carriers and sub-carriers shifted or drifted whenever recourse was not had to carrier crystal controls, it was found that for practical purposes a rather limited number of separate signals could be transmitted on one carrier.

In accordance with the present invention it is intended that the number of separate signals transmitted may be increased through a better utilization of the frequency band allotted. For example, in a system where there is a shift of the order of 60 cycles between an indication of marking and an indication of spacing it will be appreciated that approximately 18 channels of signal communication may be accommodated within a band width of the order of twenty-five hundred cycles. Under these circumstances, for frequency shift telegraphy the various sub-carrier frequency oscillators may each be modulated for mark and space conditions by some appropriate control to provide a frequency shift of plus or minus 30 cycles as the distinguishing characteristic between the marking and spacing conditions. If, for instance, it is desired that there be a guard band of the order of sixty cycles between each range of frequencies allocated to the separate messages, it will be apparent that 120 cycles will be required for each separate communication channel. Thus, assuming a minimum frequency of the order of 420 cycles, it will be appreciated that 18 separate communications or series of marking and spacing conditions may be transmitted within a frequency spectrum of the order of 2,500 cycles.

Under such conditions, however, it will be apparent that unless accurate frequency control is maintained at all times the assumed mid-point of the transmitting frequency range of plus and minus 30 cycles for each series of dots and dashes may change. To overcome this effect would require an elaborate crystal control for each of the separate message channels and thus involve a considerable expense. The invention herein set forth is intended to overcome these difficulties to a substantial degree and to provide a receiver unit which will respond accurately to the received signals regardless of whether or not there has been a drift in the oscillator frequency.

To this end, recourse has been taken to the combination of a high pass filter for conveying signals of a rapidly changing character to a marking and spacing instrument and to a voltage divider arrangement for passing currents of continuing or D. C. character to the same unit. The voltage divider arrangement is so designed and constituted as to convey a proportional change in voltage to the controlled unit whereby only a small percentage of the otherwise prevailing effect of frequency drift becomes important in the marking and spacing considerations.

Devices of this character are particularly adapted to carrier communications systems wherein the so-called Baudot type of code transmission is adopted, so that for each reproduced letter the transmitter must change between extreme positions a considerable number of times. Consequently, the invention herein to be described and claimed, through overcoming effects of frequency drift in the receiver, tends to provide a simplified form of receiving unit and at the same time makes possible the utilization of transmitter units which are not as accurately stabilized as would otherwise be essential. Thus, through this invention the overall cost of the transmitter may be reduced by a very considerable amount and yet no undue complications of the receiver mechanism are brought about.

Therefore, among the objects of the invention are those of providing a telegraph system receiver of the frequency shift variety wherein the effects of direct current drift in the reproducing system are materially reduced and substantially nullified.

Other objects of the invention are those of providing a frequency shift type of telegraph receiver in which improved reproduction of the transmitted signal carriers occurs.

Figure 1:
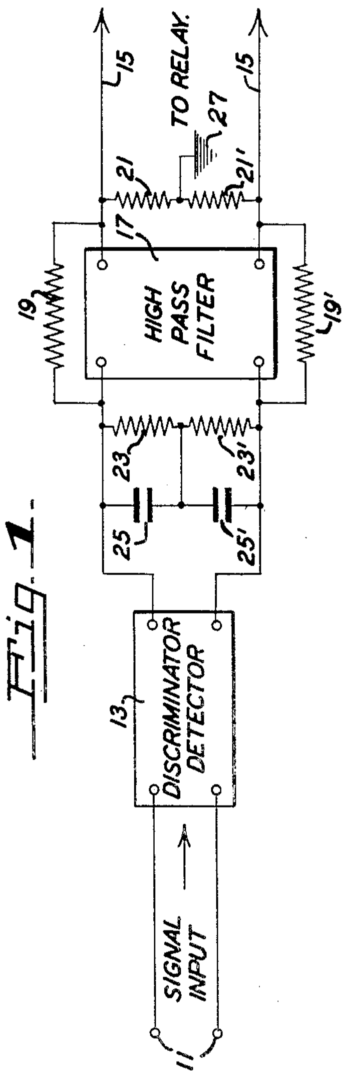

Many other objects and advantages of the invention will suggest themselves if the following description is considered in connection with the accompanying drawings, wherein, Fig. 1 is a schematic and diagrammatic showing to illustrate essentially the principles involved in operating and practicing the invention; and Fig. 2 is an exemplification of one form of circuit arrangement which has proven to be of practical utility.

Referring now to the drawings and assuming that in frequency shift telegraph operations the oscillator frequency is shifted plus and minus 30 cycles between marking and spacing conditions, it will be appreciated that the signal modulation of the main carrier is that of the sub-carriers for the various channels shifted by the permissible frequency variation. Signals of this character are then assumed to be received at the signal input transformers 11 where this point in the system represents that at which the multiplicity of transmitted signals have been selected from one another to the point where only a single dot and dash message is to be recorded. The selected signal series is then supplied through a discriminator or detector conventionally represented as 13 to select between the extreme frequency ranges. The output from the discriminator detector is to be utilized to control the marking and spacing relay (not shown) which is connected at the terminals 15. A high pass filter 17 is conveniently placed intermediate the discriminator or detector 13 and the relay terminals 15. This will serve to convey rapidly changing conditions of marking and spacing to the relay to cause a prompt and abrupt change in its position.

To supply the slowly changing voltages representative of direct current conditions a voltage divider shown to be constituted by the impedance elements 19 and 21 or 19' and 21', respectively, serially connected with one another is utilized. The input to these elements is derived across the resistors 23 and 23', respectively, which are bypassed by condensers 25 and 25'.

The impedance elements 19 and 21 or 19' and 21' are in the form of resistors, or in the alternative, may be inductive elements where an appropriate voltage drop can be derived. The controlling factor is primarily that the two elements collectively must act as a voltage divider and likewise must provide a path for conveying direct currents. Under the circumstances, it will be apparent that the high pass filter 17 eliminates direct current flow to the relay, while the impedance elements 19 and 21, or 19' and 21', as the case may be, may be so proportioned that a selected part of the total voltage drop becomes available to control the relay. Purely by way of example, and assuming the elements of the voltage divider to be resistors, the elements 19 and 19' may have a resistance of the order of 1 megohm while the elements 21 and 21' may have a resistance value of the order of ½ megohm to give the proportional voltage which is utilized for control. In the alternative, the range of resistance sizes may be varied to some extent and over a range up to, in some instances, and purely by way of example, the point where the relative values are the order of 10 to 1.

Referring now to Fig. 2 of the drawings for a representative embodiment of a complete circuit, the input terminals 11' represent the points where the carrier, properly modulated for marking and spacing conditions, is applied. To distinguish between the several separate signals there is provided a band pass filter of generally known character and which preferably may be arranged under the same conditions of transmission to pass a frequency range of the order of 80 cycles. The filter output is supplied by way of the transformer 31 and the padding conventionally represented at 33 to a number of amplifier tubes 35 and 37. These tubes are of normal character with cathode bias provided by way of the indicated by-passed cathode resistors. Plate voltage for the tube 35 is supplied in known manner from a source conventionally represented at 40 through the load resistor 41. The amplified signal output of the tube 35 is passed to the tube 37 by way of the coupling condenser 43 and resistor 45. Bias is supplied the tube 37 from the cathode circuit by way of the indicated by-passed cathode resistor combination represented at 39'. The tube 37 is loaded by the plate resistor 47 which, in turn, connects to the positive plate supply at the terminal 40. The plate supply is by-passed to ground 27 by way of any suitable condenser 42.

Amplified signals, as appearing in the output of the tube 37, are supplied by way of the transformer 49 to the discriminator-detector conventionally represented at 13. In this connection the transformer 49 supplies the signals to each of tuned circuits 51 and 51', comprising the parallel combinations of the inductive elements 53 and 53' capacitors 55 and 55'. For illustrative purposes, it will be assumed that the circuit 51 is tuned to the higher extreme of the narrow transmitted frequency band and that this frequency becomes that used for marking. Accordingly, the circuit 51' will be tuned to the minimum frequency transmitted, which, in turn, will provide the spacing indications. The detectors 50 and 50', respectively, are connected to the tuned circuits by way of their anodes. Plate voltage for these detector tubes is supplied from the indicated source 40 by way of conductor 57.

The output of the discriminator-detector is then supplied (as was disclosed in connection with Fig. 1) to the control circuit intermediate the detector and the relay connected at terminals 15. This control circuit comprises the high pass filter in the form of the condensers 52 and 52', while the voltage developer circuits in the illustrated forms again comprise the resistors 19 and 21 and 19' and 21'. Thus, rapidly changing signal conditions are passed through the high pass filter condenser 52 while the direct current changes are passed through the voltage divider. To provide some effect of smoothing a low pass filter comprising a series resistance (or in some instances an inductance) and the shunt capacity elements 59 and 61 are included in the marking circuit. A similar filter is included in the spacing circuit. Where desired, further amplification of signals may be provided through the use of the tubes 63 and 65.

While it is, of course, to be understood that wide variance in the selection of circuit parameters may be made, it is submitted purely for illustrative purposes that a tube of the so-called 6SL7 type is suitable for the tubes 35 and 37, so that, obviously, the separately shown tubes may be included within a single envelope. The detector diodes 50 and 50' may, by way of illustration, also be within a single envelope through the use of a tube of the 6AL5 type. The tubes 63 and 65, likewise, by way of example, may be within a single envelope through the use of the so-called 6SN7 tube.

With the assumed shift 30 cycles in either direction from the carrier to provide conditions of marking and spacing it has been found that the condensers 25 and 25' may be of a 0.01 mfd. size as the high frequency by-pass elements; the condensers 52 and 52′ may be of a 0.25 mfd. size; the condensers 59 and 59′ may be 0.01 mfd., and 61 and 61′, the 0.002 mfd. size; the resistors forming the voltage dividers, while capable of some variation in value, may be as follows: resistors 23 and 23′ may both be 510,000 ohms; resistors 19 and 19′ may each be 1 megohm; and resistors 21 and 21′ may each be 510,000 ohms. Of course, it will be appreciated that a wide selection of resistor sizes and values may be made within the teachings and descriptions of what has hereinabove been given. Likewise, it will be appreciated that where an inductive element is substituted for a resistance as a part of the voltage divider the resistance value thereof shall be of such a range as to provide the general over-all effect herein set forth.

Considering the effect of the circuits here described, let it be assumed that the particular channel shown operates on a nominal frequency of 2130 cycles, giving a "mark" frequency of 2160 and a "space" frequency of 2100 cycles, that this change in frequency causes a change in the differential voltage delivered to the amplifier of 2 volts (i. e., ±1 volt for a departure of 30 cycles from the nominal carrier frequency), that the circuit is used to transmit Baudot code at 60 words per minute, corresponding to a signalling frequency of 30 cycles per second, and that the amplifier tubes 63 and 65 are balanced to supply zero current to the polarized relay at the carrier frequency of 2130 cycles. Then, if the carrier oscillator drifts by about .1%, or 22 cycles, say to 2108 cycles, in the absence of the present invention the voltage delivered to the tubes 63 and 65 would vary between +.266 volts and −1.734 volts, the former being insufficient to throw the relay from "space" to "mark" and the system becoming inoperative, although the differential voltage would remain the same.

With the circuit as shown in Fig. 2, the differential voltage appears as before on the grids of tubes 63 and 65. The D. C. component, however, is attenuated by the voltage-divider networks 19—21 and 19′—21′, and the voltage appearing on the grids of tubes 63 and 65 varies between +.755 and −1.245, the bias caused by the frequency drift having been reduced by nearly ⅔. The frequency drift here assumed is excessive but even so polarized relays can safely be adjusted to operate on a 25% drop in current from normal operating value. Without this invention the oscillator stability would have to be improved to give a maximum long period drift of not over ±7.35 cycles, or .0345% to equal this performance.

The improved operating characteristics offered by the invention may be used as desired by the system designer. It can be used, with sharper filters and more sensitive discriminators to give closer channel spacing and hence more channels, or to give greater reliability on the same number of channels. Preferably a compromise effect may be used channel spacing being decreased from about 180 cycles to the 120 cycles (center frequency), here described, with improved performance on the greater number of channels.

Having now described the invention, what is claimed is:

1. In a signalling circuit to which signals varied in frequency at a signalling rate by small opposite deviations from a mean value are supplied, a circuit for operating a polar relay or the like comprising detector means selectively responsive to frequency deviations in opposite directions to produce output currents in opposite directions, an output impedance adapted to draw both alternating and direct current from said detector means, and connections between said detector means and said impedance including separate D. C. and A. C. paths for supplying such current.

2. The signalling circuit of claim 1 wherein the A. C. path of the control circuit comprises a high pass filter.

3. The signalling circuit of claim 1 wherein the D. C. path of the control circuit comprises at least one impedance element forming a portion of a voltage divider of which said output impedance includes a second portion to minimize the effect of frequency drift of the supplied signals.

4. The signalling circuit of claim 1 wherein the D. C. path of the control circuit comprises at least one resistive impedance element forming a portion of a voltage divider of which said output impedance includes a second portion to minimize the effect of frequency drift of the supplied signals.

5. The signalling circuit of claim 1 wherein the resistance of said D. C. path is high in comparison to the resistance of said output impedance.

6. The signalling circuit of claim 1 wherein the resistance of said D. C. path is relatively high and the impedance of said A. C. path at signalling frequency is relatively low in comparison to the resistance and impedance, respectively, of said output impedance.

7. In a signalling circuit to which signals varying in frequency between predetermined limiting values of small frequency range are supplied, detector means to select the signals at each extreme of the frequency range selected, a load circuit connected to respond to the different conditions of frequency shift in different extremes, and a circuit including a high pass filter for supplying the A. C. component only of the signal to the load circuit and one portion of an impedance type voltage divider for supplying only selected portions of the D. C. component of the signal to a second portion of said voltage divider, said second portion being connected in parallel with said load circuit.

8. A signal reproducing circuit for converting received signals normally varying between selected maximum and minimum frequency values of relatively small frequency separation to portray conditions of marking and spacing, a discriminating detector to select between the two selected maximum and minimum frequencies, a polar relay to respond in different fashion to each of the selected maximum and minimum frequency signals so as to provide marking and spacing designations controlled by the instantaneously received signal, and a controlling circuit having an A. C. path comprising at least a capacity element to convey rapidly changing frequency received signals to the relay and also having a D. C. path comprising a voltage divider including at least one impedance element to pass direct currents for causing continual relay response during continued receipt of each extreme of frequency selected and concurrently minimizing the effect of frequency drift in the transmitted signals by proportional selection of the connection of the relay to the voltage divider.

9. In a frequency-shift carrier telegraph system, a discriminator-detector tuned to supply opposite potentials in response to frequency shifts in opposite directions from a selected average frequency, a load circuit responsive to such opposite potentials, and a circuit for supplying reversals of potential occurring at a rapid rate to said load circuit while minimizing the effect of long-period frequency drift comprising at least one high-pass element connecting said discriminator-detector to said load circuit and a voltage divider comprising elements conductive to direct current connected across said discriminator-detector, said high-pass element being connected across one portion of said voltage divider and said load circuit including another portion of said voltage divider.

10. Apparatus in accordance with claim 9 wherein said high-pass element comprises a condenser.

11. Apparatus in accordance with claim 9 wherein said discriminator-detector is of the balanced type, and including a high-pass element and a voltage divider connecting each side of said discriminator-detector to said load circuit.

KURT E. APPERT.

REFERENCES CITED

The following references are of record in the file of this patent:

UNITED STATES PATENTS

| Number | Name | Date |
|---|---|---|
| 2,460,061 | Chapin | Jan. 25, 1949 |

FOREIGN PATENTS

| Number | Country | Date |
|---|---|---|
| 726,391 | Germany | Oct. 12, 1942 |
| 849,352 | France | Aug. 11, 1939 |